(12) United States Patent
Beatty et al.

(10) Patent No.: US 8,768,125 B2
(45) Date of Patent: Jul. 1, 2014

(54) GUIDE PIN FOR ALIGNING FERRULES WITH ENHANCED ALIGNMENT FEATURE

(75) Inventors: John W Beatty, Maiden, NC (US); Dennis Michael Knecht, Hickory, NC (US); Christopher Paul Lewallen, Hudson, NC (US); James Phillip Luther, Hickory, NC (US); Wesley Allan Yates, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 522 days.

(21) Appl. No.: 13/094,325

(22) Filed: Apr. 27, 2011

(65) Prior Publication Data

US 2011/0262075 A1 Oct. 27, 2011

Related U.S. Application Data

(60) Provisional application No. 61/327,961, filed on Apr. 26, 2010.

(51) Int. Cl.
*G02B 6/38* (2006.01)

(52) U.S. Cl.
USPC .................. 385/52; 385/60; 385/72; 385/78

(58) Field of Classification Search
None
See application file for complete search history.

(56) References Cited

U.S. PATENT DOCUMENTS

| | | | |
|---|---|---|---|
| 4,269,026 A | 5/1981 | Bulle et al. | 59/82 |
| 4,830,456 A * | 5/1989 | Kakii et al. | 385/75 |
| 6,886,988 B2 | 5/2005 | Brown et al. | 385/53 |
| 7,036,993 B2 * | 5/2006 | Luther et al. | 385/53 |
| 7,052,187 B2 * | 5/2006 | Ohtsuka et al. | 385/60 |
| 7,191,586 B2 | 3/2007 | Yamamoto | 59/82 |

FOREIGN PATENT DOCUMENTS

| | | | |
|---|---|---|---|
| JP | 63311218 A | * | 12/1988 |
| JP | 08094883 A | * | 4/1996 |
| JP | 2001133661 A | * | 5/2001 |

OTHER PUBLICATIONS

Spirol, Standard Coiled Pins Specifications and Technical Data, pp. 4-6.

* cited by examiner

*Primary Examiner* — Michelle R Connelly

(57) ABSTRACT

A guide pin for mating multi-fiber optical ferrules includes a first end, a second end and a flexile feature adjacent to the second end. The first end has a first end width and the second end has a first engagement width and may change to a second engagement width while engaging a guide pin bore in a ferrule. The change in width permits the guide pin to engage and axially align with guide pin bores of varying diameters to achieve reliable optical mating of optical wave guides.

19 Claims, 16 Drawing Sheets

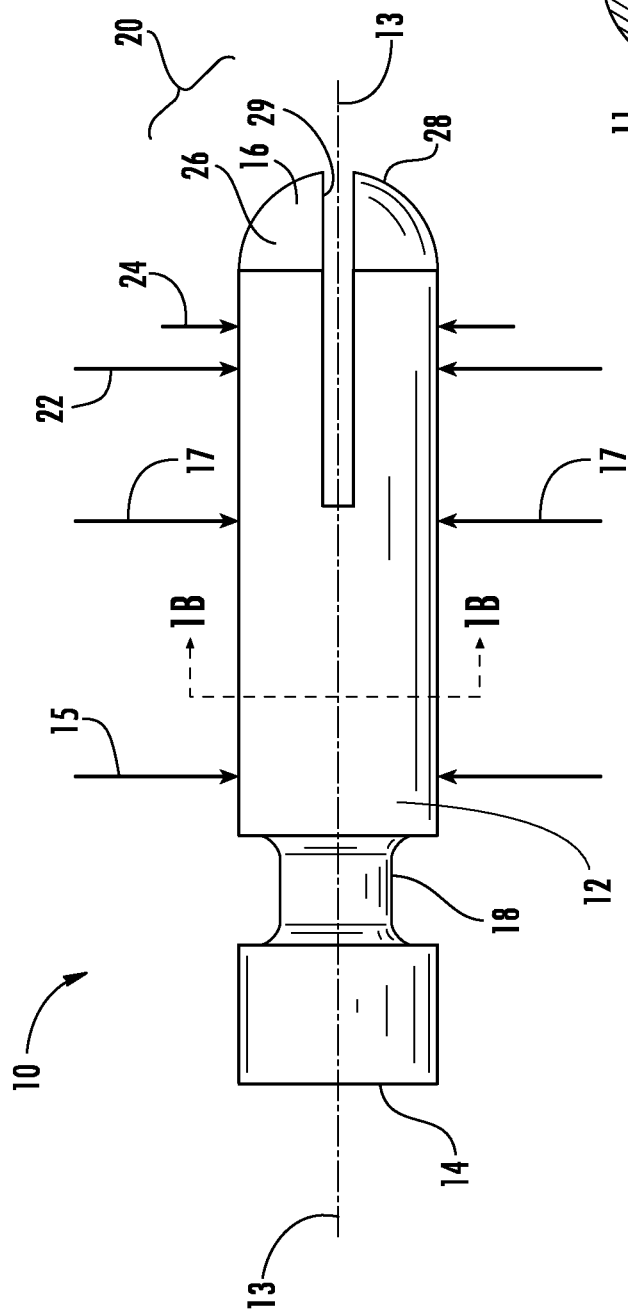

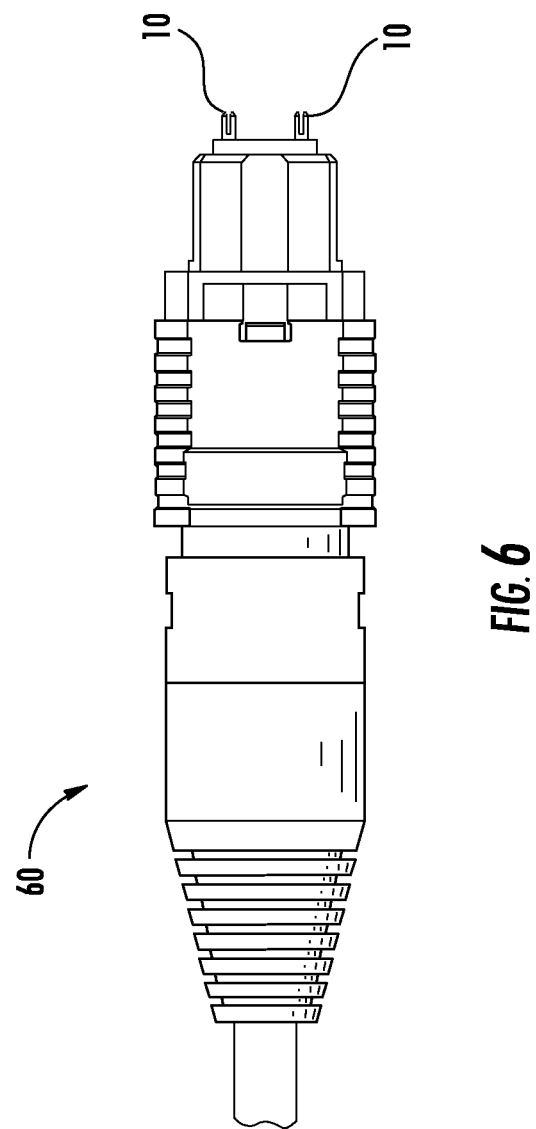

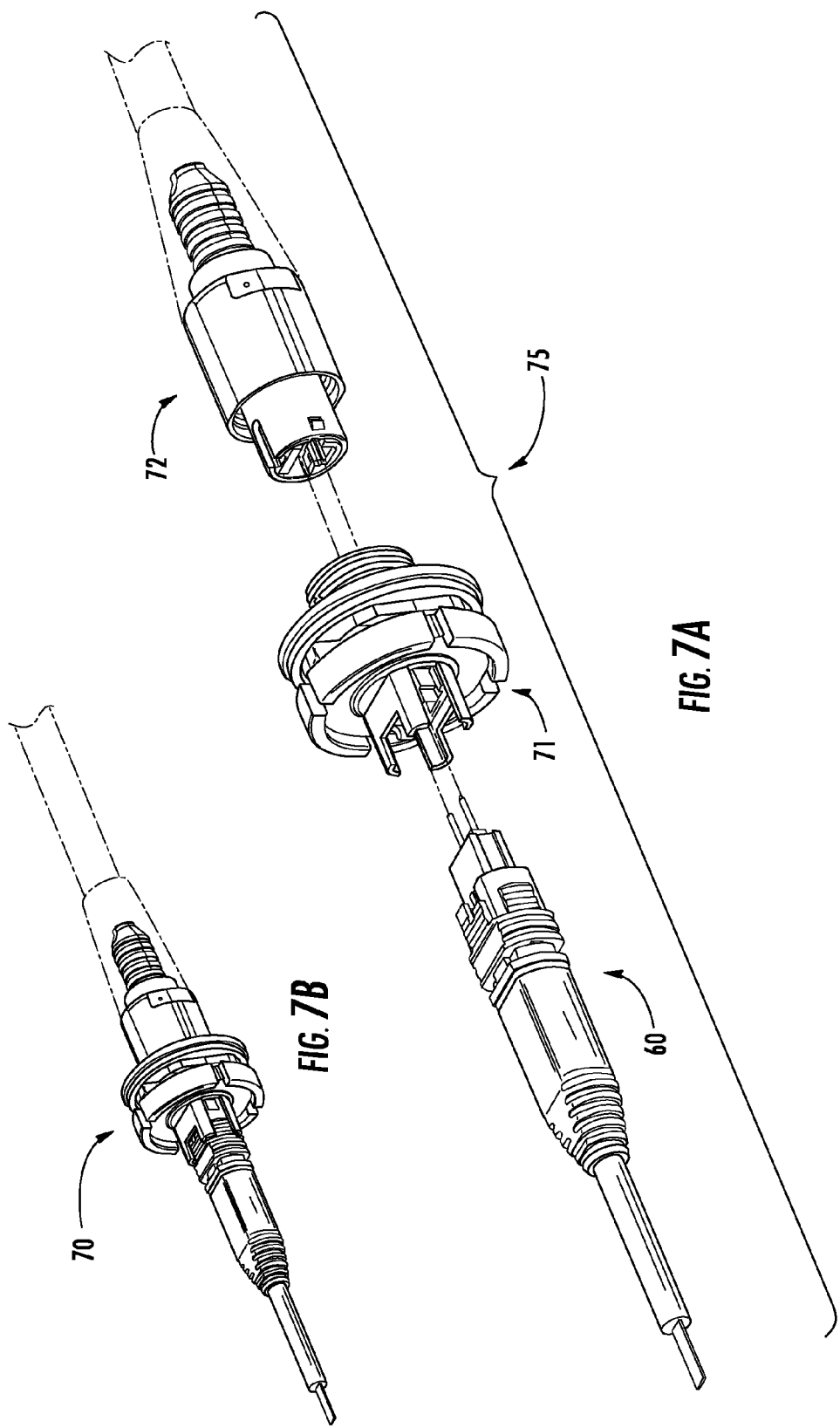

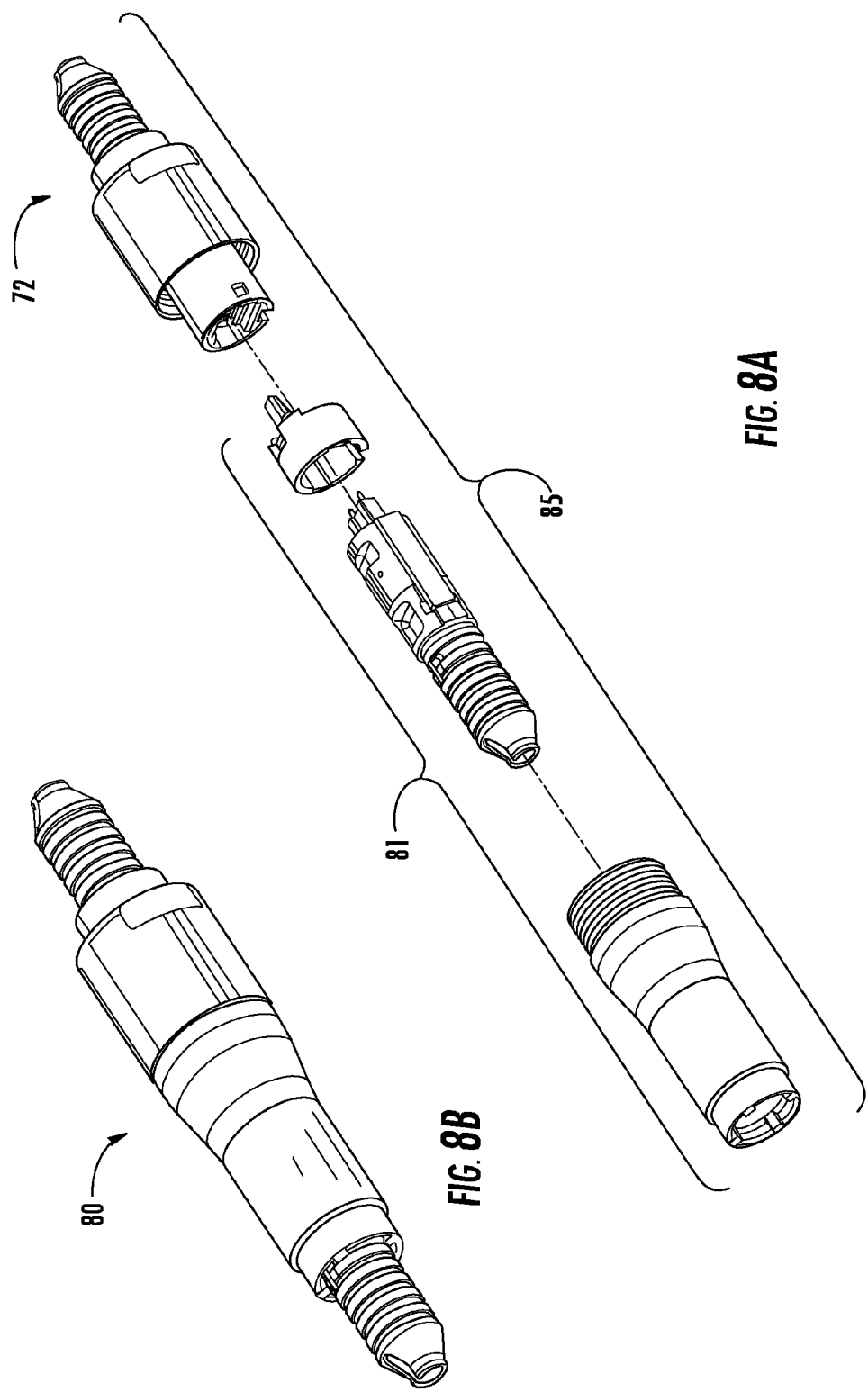

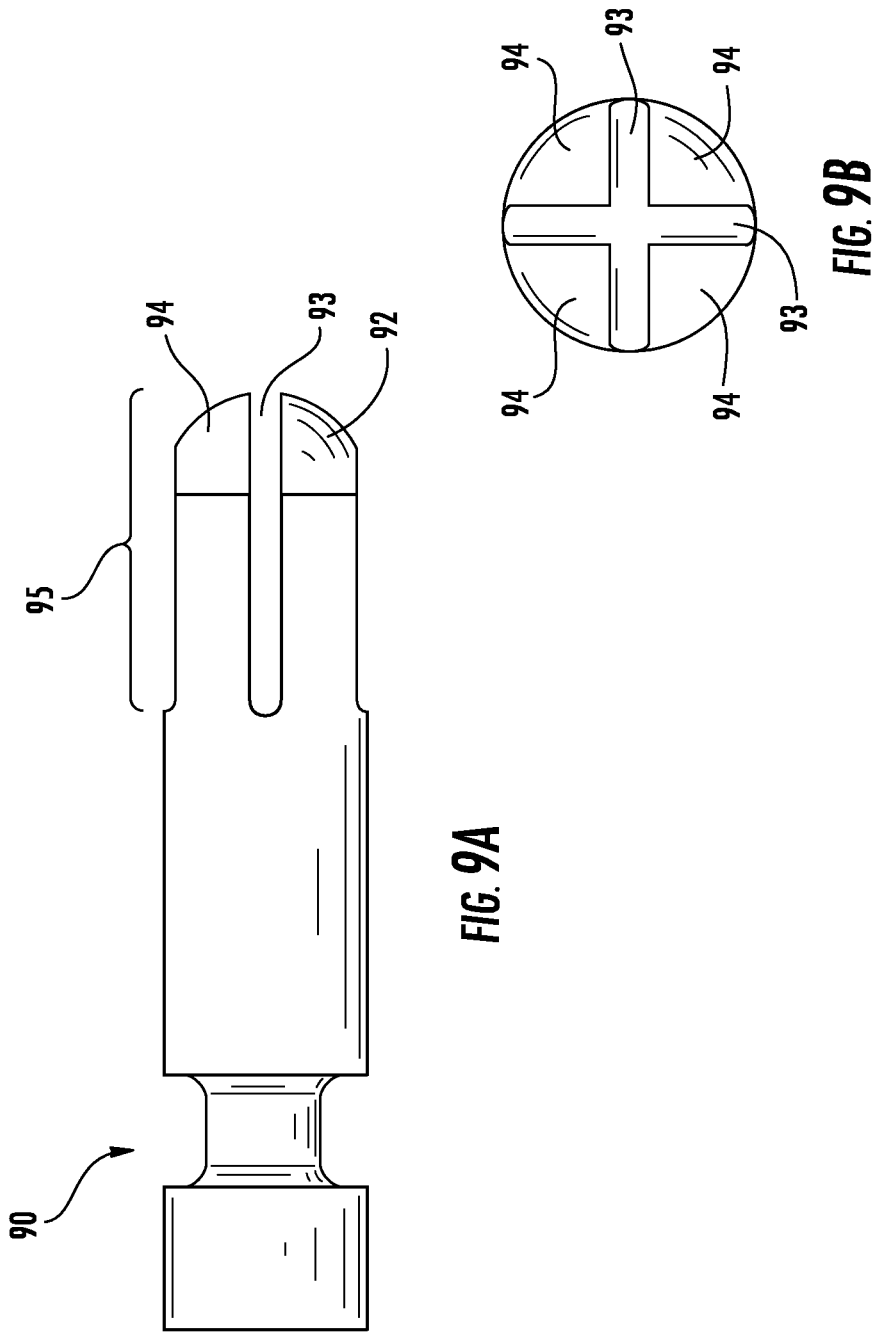

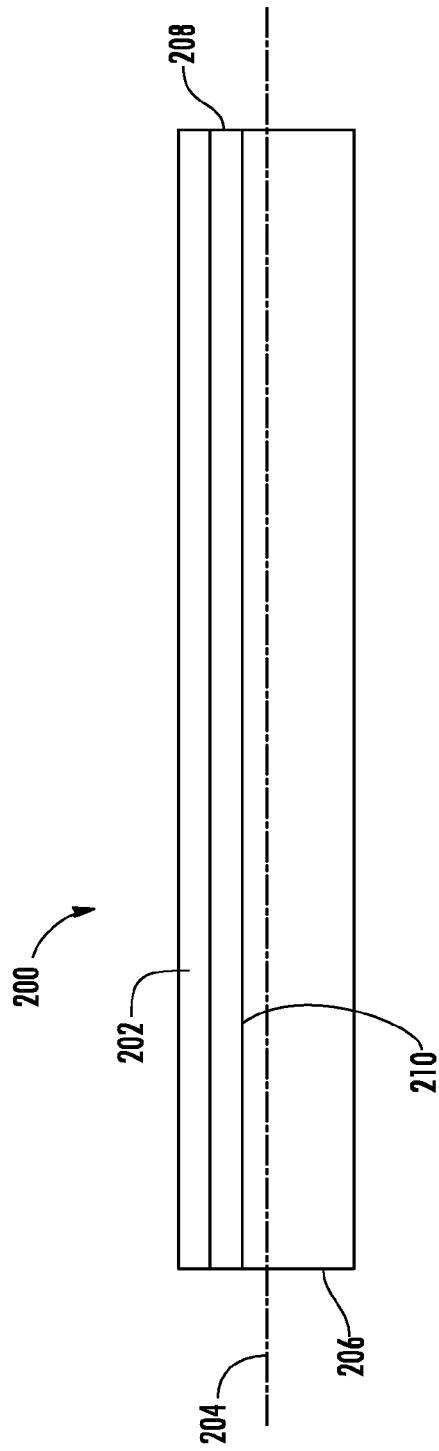
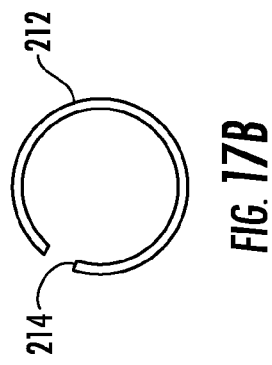
FIG. 17A
FIG. 17B

GUIDE PIN FOR ALIGNING FERRULES WITH ENHANCED ALIGNMENT FEATURE

PRIORITY APPLICATION

The present application claims priority to U.S. Provisional Ser. No. 61/327961 filed on Apr. 26, 2010 and entitled "GUIDE PIN FOR ALIGNING FERRULES WITH ENHANCED ALIGNMENT FEATURE", the contents of which are incorporated by reference.

BACKGROUND

1. Field of the Disclosure

The disclosure relates to a guide pin for aligning and mating fiber optic ferrules. In particular, the disclosure relates to a guide pin having a flexile feature for aligning and mating multi-fiber optical ferrules that have a large pin-to-bore fit.

2. Technical Field

In mating multi-fiber molded ferrules, guide pins are necessary and accepted devices to achieve a high degree of precision for axially aligning and optically coupling a plurality of optical wave guides. In the past, the quality of the optical waveguide coupling was totally dependent upon a precise friction fit between the metallic guide pin and the guide pin bore of the molded polymer ferrule. This precision was then dependent upon the degree of tolerance between the guide pin bore inner diameter and the guide pin outer diameter, which was at the mercy of temperature fluctuations and changes in relative humidity. Further, tolerance stacking of the various components in the construction of the molded optical ferrules and the metallic guide pins contributed to poor inter-mating performance between the guide pin and the molded optical ferrule, subsequently causing poor optical mating performance between optical wave guides.

Typically, metallic guide pins have a nominal diameter of 0.700 millimeters (mm) More specifically, guide pins usually have a diameter of 0.698 mm to 0.699 mm, with 0.0000 mm to 0.0005 mm cylindricity. Molded polymer multi-fiber ferrules have guide pin bore diameters of 0.6990 mm to 0.6996 mm. Being molded from a polymer, polymer ferrules have issues of parallelism and surface roughness for the guide pin bores that must be accounted for. Guide pins with the smallest diameter mated to the bores with the largest acceptable diameters can experience a so called "sloppy" fit, with unreliable optical performance due to lateral offset and torsion. Guide pins with the largest acceptable diameters mated to ferrules with the smallest acceptable diameters can experience excessively tight fits that can lead to unreliable optical performance due to gaps between polished optical waveguides and, worse, damage to the ferrule itself. Even so called perfectly mated guide pins and bores in the prior art can experience unreliable mating due to excesses in humidity, the presence of debris in the bore, and scoring on the pin shaft, all of which can affect how well the pins mate to the bores.

What is needed is a new guide pin that can adapt to tight or loose pin-to-bore fits, whether unintentional or by design, to ensure consistently reliable optical mating of optical wave guides in molded multi-fiber optical ferrules.

SUMMARY

One embodiment of the disclosure a guide pin is disclosed for mating ferrules. The guide pin may include an elongated body having a generally roundish cross section and an axis therethrough. The axis may extend from a first end for inserting into a ferrule to a second end for engaging another ferrule for mating ferrules. At least a portion of the first end may have a first end width and at least a portion of the second end, being opposite the first end for engaging another ferrule, may have a second end width.

In exemplary embodiments, the guide pin of the disclosure may include a flexile feature having a first engagement width, which can change to a second engagement width while engaging another ferrule for mating ferrules, the second engagement width being up to 20% smaller than the first engagement width.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE FIGS

Embodiments of the disclosure are illustrated by the accompanying drawings, in which:

FIG. 1A is a side view of a guide pin having an flexile feature on an end;

FIG. 1B is a cross sectional view of the guide pin of FIG. 1A;

FIG. 6 is a fiber optic connector assembly with the multi-fiber ferrule assembly of FIG. 5;

FIGS. 7A and 7B are an exploded perspective view and assembled perspective view of a multi-fiber connector adapter having the guide pins of FIG. 1A and the fiber optic connector assembly of FIG. 6;

FIGS. 8A and 8B are an exploded perspective view and assembled perspective view of yet another multi-fiber connector adapter having the guide pins of FIG. 1A and the multi-fiber ferrule assembly of FIG. 5;

FIGS. 9A and 9B depict a side view and an end view of an alternate embodiment of a guide pin having an flexile feature on an end;

FIGS. 17A and 17B are a side view and an end view of an embodiment of a guide pin having a flexile feature, the flexile feature extending the length of the guide pin.

DESCRIPTION

Figure 2:
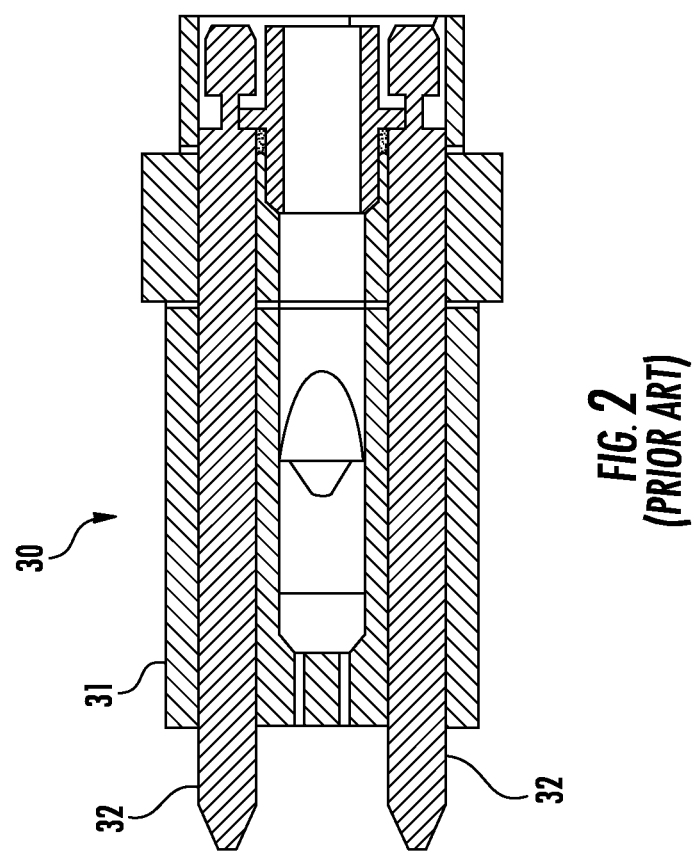
FIG. 2 is a cross sectional view of a multi-fiber ferrule having a pair of conventional guide pins.

Reference is now made in detail to the present embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

The disclosure generally relates to a guide pin for mating multi-fiber optical ferrules without regard to any dissimilarity between the width, e.g., diameter, of a guide pin bore of one ferrule to another ferrule, and/or a width of the guide pin of the disclosure. In the past when the diameter of the guide pin and the guide pin bore was mismatched, for example, the guide pin having a larger width than the width of the receiving guide pin bore, there was a degradation of optical transmission due to misalignment or gaps, or actual ferrule damage during mating or de-mating. The guide pin of the disclosure, which includes a flexile feature, can adapt to any such mismatch and ensure a more consistent alignment and optical mating of optical wave guides. A guide pin 10 (FIG. 1A) for mating ferrules may have a generally roundish profile 11 (FIG. 1B) and include an elongated body 12 with an axis 13, for example, a longitudinal axis, generally extending from a first end 14 to a second end 16. First end 14, in exemplary embodiments, may be inserted into a ferrule, for example, an optical ferrule designed to receive guide pins for mating ferrules. A locking feature 18 may be associated with first end 14, for example, nearer first end 14 than to second end 16, for securing first end 14 to the ferrule, for example, by a clip or some other device. Second end 16, in exemplary embodiments, may be for engaging another ferrule, for example, an optical ferrule for mating ferrules.

Guide pin 10 of the disclosure may include, in exemplary embodiments, a flexile feature 20 associated with second end 16, for example, nearer second end 16 than to the first end 14. Flexile feature 20 (FIG. 1) may have at least two (2) flexible members 26, 28 separated by, for example, a slot 29 disposed between flexible members 26, 28, and associated with second end 16 along elongated body 12 for a distance, though other embodiments are disclosed.

Guide pin 10 further may have a first end width 15 associated with first end 14 and a second end width 17 associated with second end 16. Flexile feature 20 may include a first engagement width 22 across at least a portion of flexile feature 20. First engagement width 22 may be substantially equal to or greater than first end width 15. Flexile feature 20 may be, for example, elastically deformed while engaging another ferrule for mating ferrules, changing, for example, from first engagement width 22 to a second engagement width 24. "Elastically deformed" may be defined for purposes of this disclosure as a substantial change in the engagement width, for example, an effective diameter, due to an outside influence, for example, an insertion of second end 16 having flexile feature 20 into a guide pin bore that is smaller than first engagement width 22; flexile feature 20 may substantially return from second engagement width 24 to first engagement width 22 when the external influence is removed, for example, retracting guide pin 10 from the guide pin bore that is smaller than first engagement width 22. Second engagement width 24 may be smaller than first engagement width 22, for example, up to 20% smaller. For example, a first engagement width of about 0.75 millimeters (mm) may change to a second engagement width as small from about 0.75 mm to about 0.60 mm while mating with another ferrule. In other exemplary embodiments, second engagement width 24 may be up to about 10% smaller than first engagement width 22, and in yet other embodiments second engagement width 24 may be up to about 5% smaller than first engagement width 22. Slot 29 may be substantially along axis 11 and flexible members 26, 28 may be dimensionally equivalent, for example, causing an equal and opposite reactionary force applied to, for example, an inner surface of a guide pin bore engaging flexile feature 20, for example, causing substantial alignment of axis 11 and a bore axis of the guide pin bore.

Figure 3:
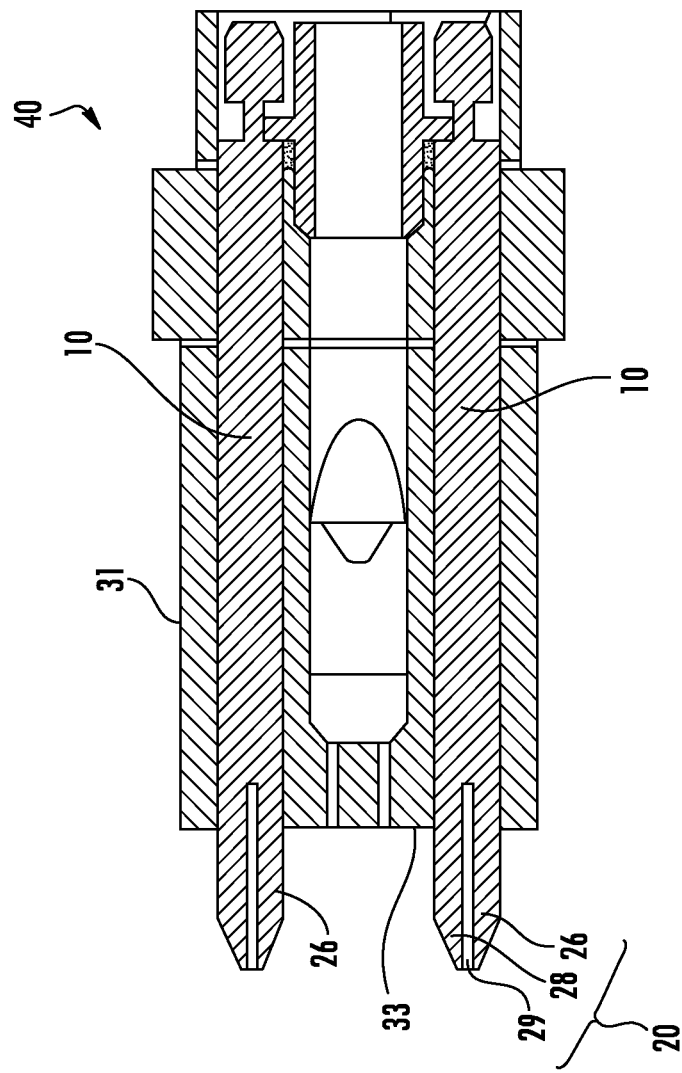
FIG. 3 is a cross sectional view of a multi-fiber ferrule having a pair guide pins of FIG. 1A.

By way of example, a two-fiber ferrule assembly 30 may include an exemplary multi-fiber polymer ferrule 31 with, for example, prior art guide pins 32 installed (FIG. 2). By contrast, an exemplary two-fiber ferrule assembly 40 (FIG. 3) may include multi-fiber polymer ferrule 31 with, for example, guide pins 10 installed, guide pin 10 having, for example, flexile feature 20, including flexible members 26, 28 and slot 29. Slot 29, for example, may extend from second end 16 to beyond a front face 33 of multi-fiber polymer ferrule 31. This permits flexile feature 20, for example, to engage the bore of ferrule 31 of the ferrule assembly 30.

Figure 4:
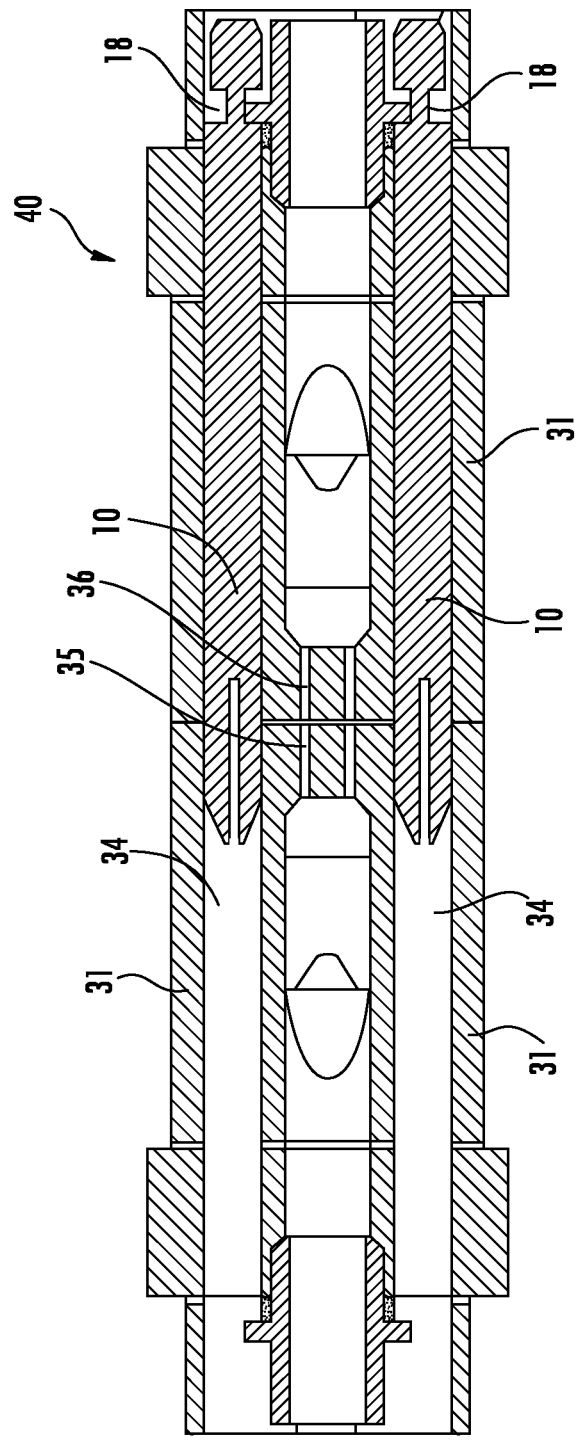
FIG. 4 is a cross sectional view of the multi-fiber ferrule of FIG. 3 mated to another ferrule.

Two-fiber ferrule assembly 40 may be mated with another multi-fiber polymer ferrule 31 (FIG. 4). Guide pins 10 are locked into two-fiber ferrule assembly 40 using, for example, a clip or a pin keeper that engages locking feature 18, preventing axial pullout. Flexile feature 20 may engage a portion of guide pin bore 34 within the other multi-fiber polymer ferrule 31. A first fiber bore 35 within the other multi-fiber polymer ferrule 31 is shown aligned with a second fiber bore 36 within multi-fiber polymer ferrule 31 of two-fiber ferrule assembly 40. The inner surface of guide pin bore 31, by engaging flexile feature 20, may exert such a force on each of the at least two (2) flexible members 26, 28 as to elastically deform, for example, by bending inwardly, flexible members 26, 28 toward axis 13. Flexile feature 20, having first engagement width 22, may be elastically deformed to second engagement width 24. Second engagement width 24 may be at least about equal to the width or diameter of that portion of a guide pin bore being engaged by flexile feature 20.

Figure 5:
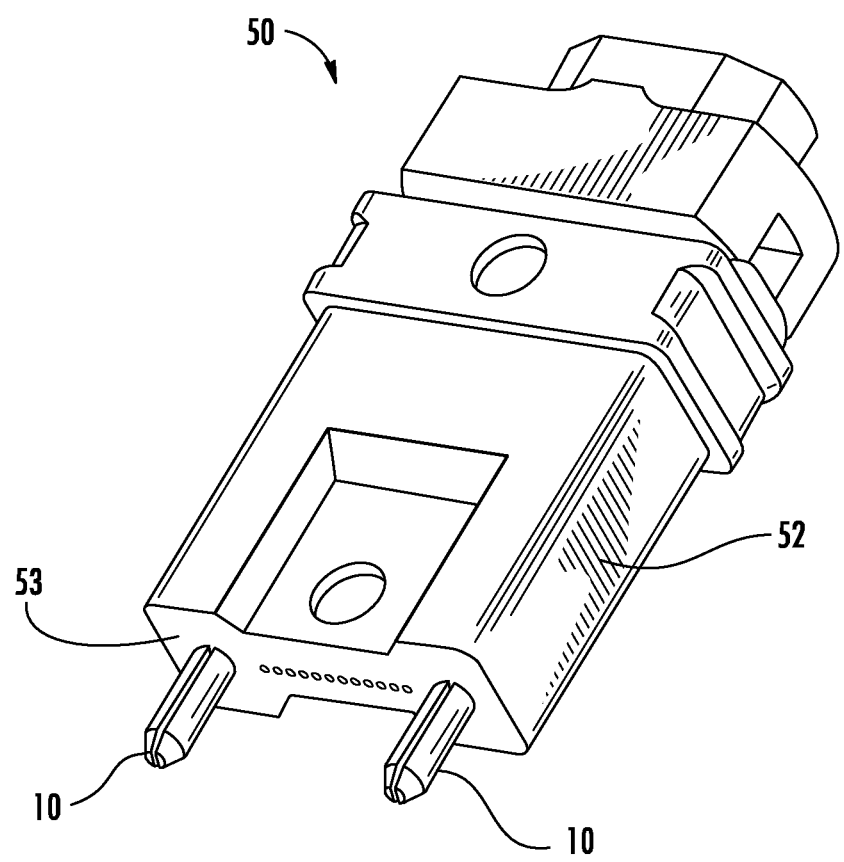
FIG. 5 is perspective view of a multi-fiber ferrule assembly with a pair of the guide pins of FIG. 1A.

Guide pins 10 may be installed in other multi-fiber polymer ferrules, such as a twelve-fiber MT ferrule 52 of assembly 50 (FIG. 5). In exemplary embodiments, slots 29 may extend down the length of the guide pins 10 and, for example, past endface 53 of MT ferrule 52. MT ferrule assembly 50 may be found in connector housings of a number of such fiber optic cable assemblies as MPO/MTP connector assembly 60 (FIG. 6). Such MPO/MTP connector assemblies may be used in so called fiber-to-the-home (FTTH) applications, datacenter hardware such as the LANscape® Pretium™ line of products, commercially available from Corning Cable Systems, LLC, Hickory NC, and other areas where high density fiber optic interconnection may be useful. In an exemplary embodiment 75, MPO/MTP connector assembly 60 may mate with, for example, an OptiTip™MT Connector 72 (FIGS. 7A and 7B), commercially available from Corning Cable Systems, LLC, Hickory NC, via an adapter 71 configured to intermate two such dissimilar fiber optic connector assemblies, resulting in a fully mated connector/adapter assembly 70. By way of example, connector/adapter assembly 70 may be used to bridge an optical connection from a sealed environment to a rugged environment, as through an aperture in a sealed housing. In another embodiment 85 (FIG. 8A), twelve-fiber MT ferrule assembly 50, having guide pins 10 installed, housed within OptiTip™ MT Connector 72 may mate with, for example, rugged in-line adapter 81, resulting in fully mated in-line connector/adapter assembly 80 (FIG. 8B).

Figure 10A:
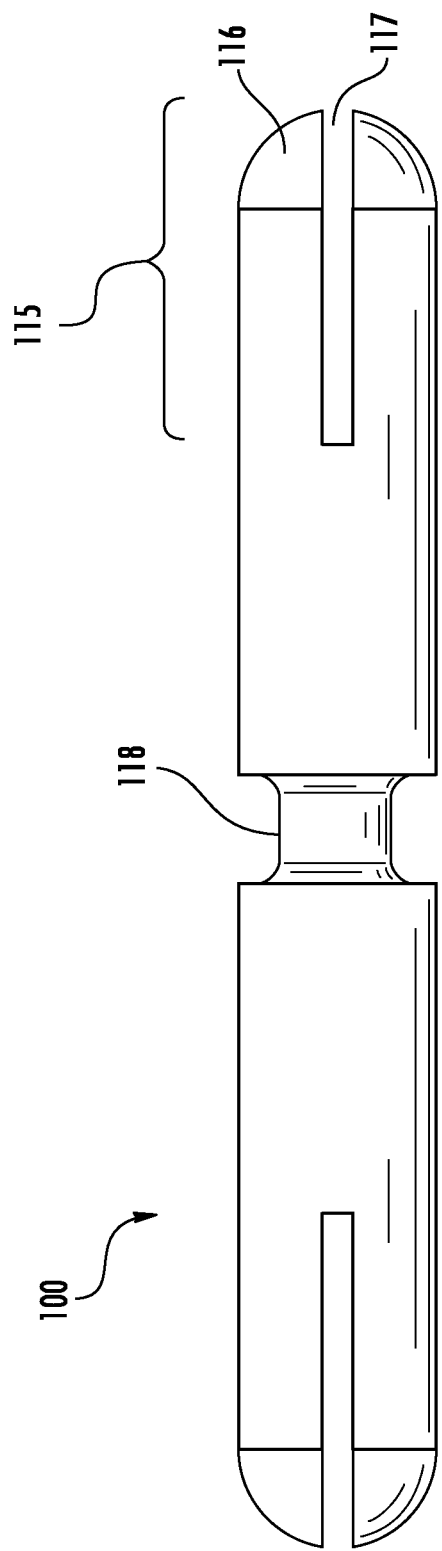
FIG. 10A is a side view of a further alternate embodiment of a guide pin having an flexile feature on two ends and a locking feature in a medial portion.
Figure 10B:
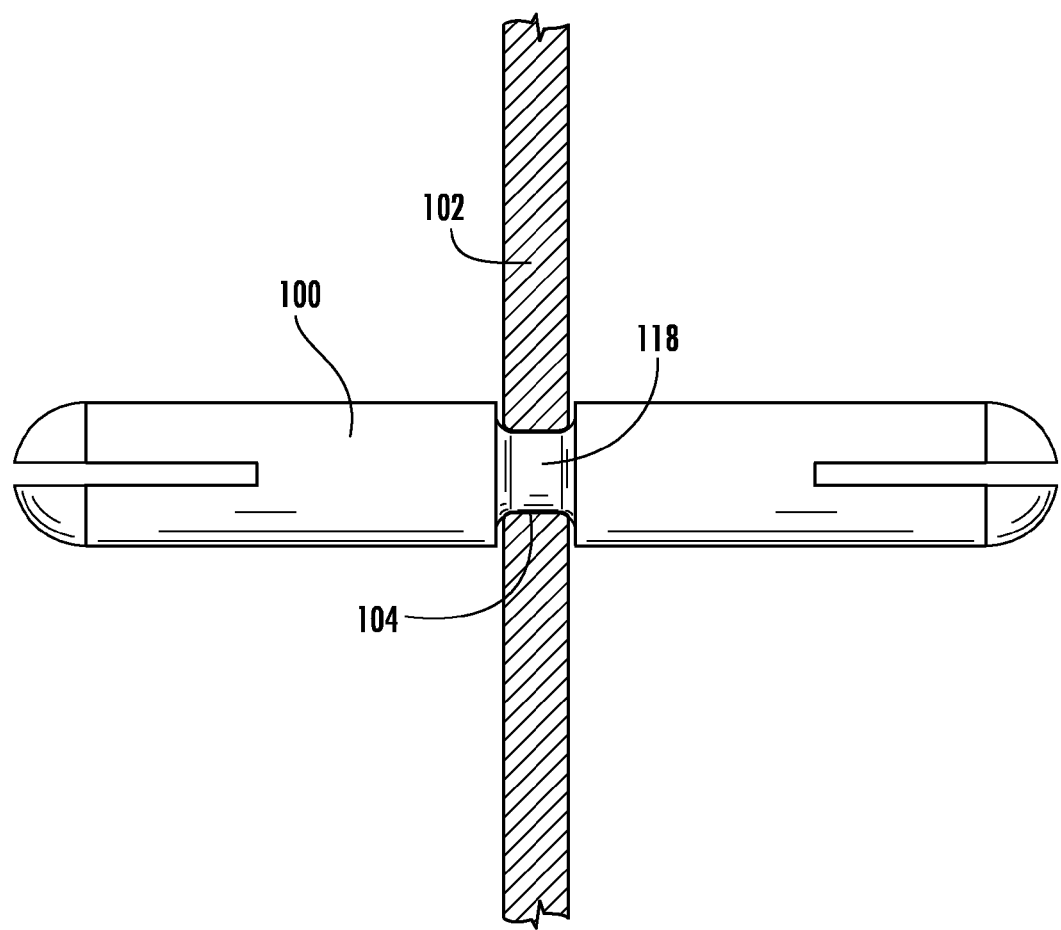
FIG. 10B is the alternate embodiment of FIG. 10A installed in a plate.

In other alternate embodiments, a guide pin 90 having a first alternate flexile feature 95 having at least four (4) flexible members 94 and at least two (2) slots 93 disposed near a second end 92 (FIGS. 9A and 9B). In yet other embodiments, a guide pin 100 may have a locking notch 118 medially located, for example, centrally located for locking into an apparatus (FIG. 10A), and also may have a double flexile feature 115 on opposing ends. In an exemplary embodiment double flexile feature 115 may have at least two (2) flexible members 116 and double slots 117 disposed at the opposing ends. Guide pin 100 may be held, by way of example, in an aperture 104 of a plate 102 (FIG. 10B). In such an embodiment, guide pin 100 may engage two (2) so called female ferrules in two (2) fiber optic connector assemblies, one from each side.

Figures 11A, 11B:
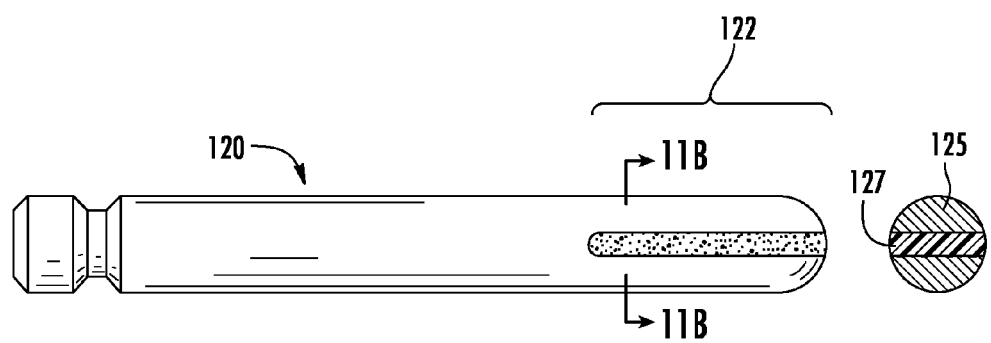
FIGS. 11A and 11B are a side view and a cross sectional view of yet another alternate embodiment of a guide pin having an flexile feature on an end.

A further alternate embodiment of the disclosure (FIGS. 11A and 11B) may be a guide pin 120 having a flexile feature 122 that includes, for example, at least two (2) flexible members 125 with a polymer 127 disposed between flexible members 125. Polymer 127 may include a thermoset polymer or a thermoplastic polymer. In exemplary embodiments, polymer 127 may be identical in composition to such a polymer as used in the making of the respective ferrules to be mated, closely matching, for example, the material properties of the flexile feature 122 comprising a polymer to the ferrule, material properties such as modulus of elasticity, sensitivity to humidity, heat, cold, etc. In other embodiments, polymer 127 may be selected specifically to have different mechanical properties from such polymers as may be used in the making of the respective ferrules.

A method of making such a flexile feature 122 may be an overmolding or insert molding method. Guide pin 10, 120 may be made from, for example, a metal, such as steel, or other suitable material, such as a ceramic. By way of example, guide pin 10, 120, being made of steel may be prepared, for example, by removing material from the elongated body near the second end using a cutting method such as grinding, turning, or electrical discharge machining (EDM), for example, creating a polymer receiving feature on guide pin 120. EDM may be used to cut the slots 29, 93 and 117 (FIGS. 1, 9A-B and 10A-B). The prepared pin may be placed, for example, into a receiving mold that closely matches the external dimensions of the original guide pin and may be adapted to receive a molten polymer material therein, filling the voids created by the removed material. Upon extraction from the receiving mold, guide pin 120 may have a polymer flexile feature 122 that has a first engagement width, and may be elastically deformable to a second engagement width. The elastic deformation of the polymer flexile feature may be a compression created by inserting flexile feature 122 into such a guide pin bore of a receiving ferrule as a smaller guide pin bore than the first engagement width.

Figures 12A, 12B:
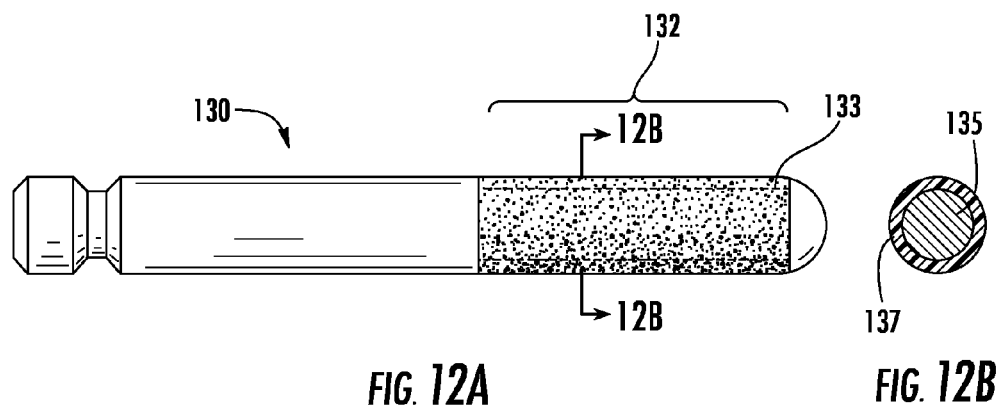
FIGS. 12A and 12B are a side view and a cross sectional view of yet another alternate embodiment of a guide pin having an flexile feature on an end.
Figures 13A, 13B:
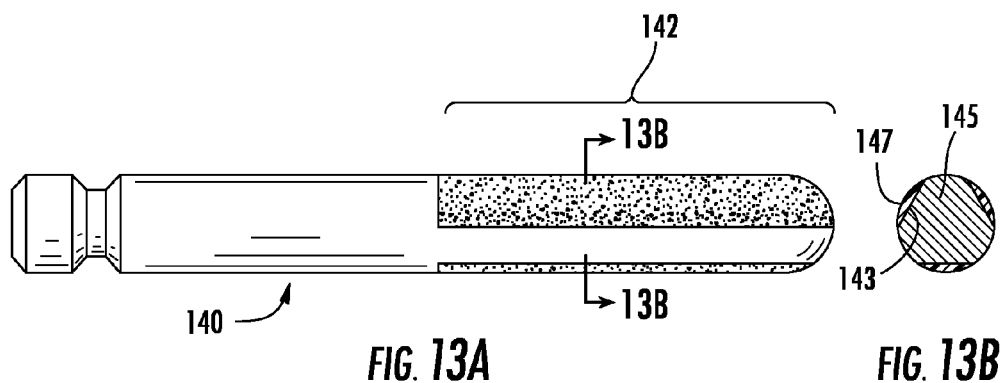
FIGS. 13A and 13B are a side view and a cross sectional view of yet another alternate embodiment of a guide pin having an flexile feature on an end.
Figures 14A, 14B:
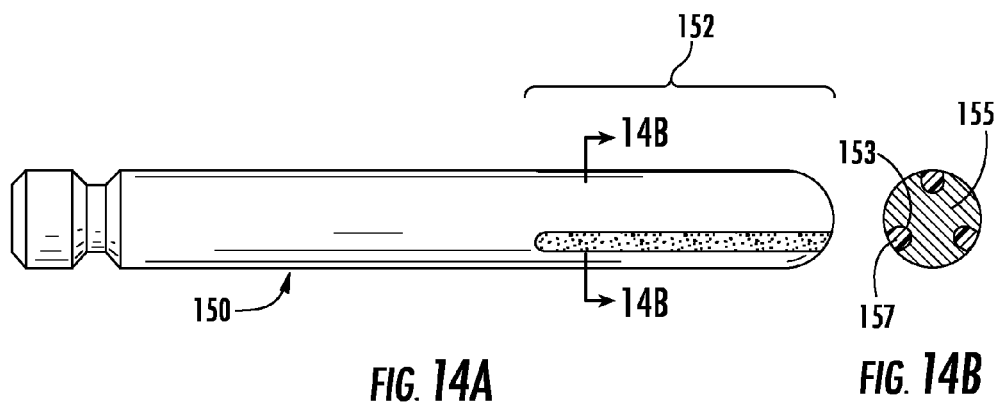
FIGS. 14A and 14B are a side view and a cross sectional view of yet another alternate embodiment of a guide pin having an flexile feature on an end.
Figures 15A, 15B:
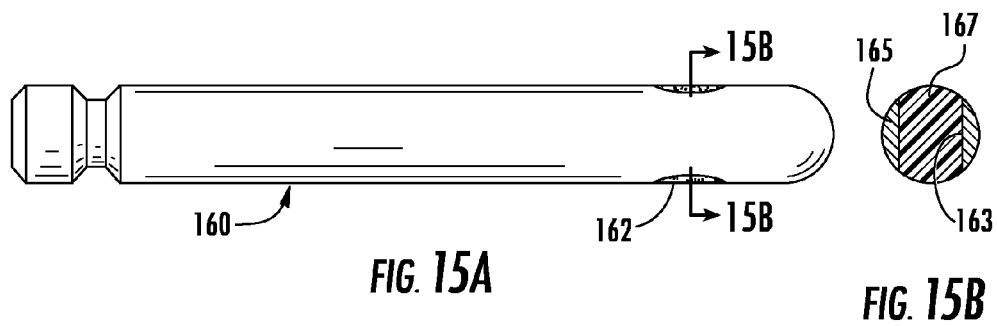
FIGS. 15A and 15B are a side view and a cross sectional view of yet another alternate embodiment of a guide pin having an flexile feature on an end.
Figure 16:
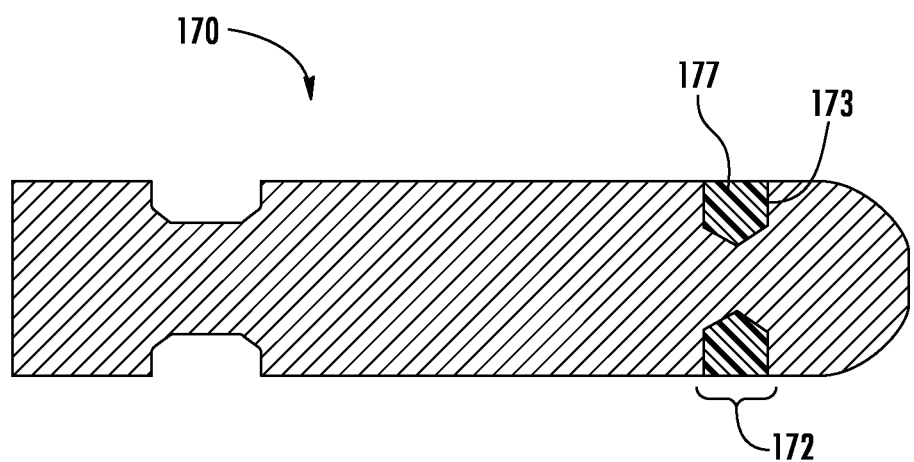
FIG. 16 is a cross sectional view of another embodiment of a guide pin having an flexile feature on an end.

In yet other exemplary embodiments, the disclosure relates other guide pins having a polymer applied to a polymer receiving feature, the polymer providing the elastically deformable flexile feature. A guide pin 130 (FIGS. 12A and 12B) may have a flexile feature 132 having, for example, a turned step 133 to receive a polymer 137 that may surround, for example, a circumference of a central portion 135, polymer 137 being, for example, elastically compressible. A guide pin 140 (FIGS. 13A and 13B) may have a flexile feature 142 having, for example, at least one flat 143 to receive a polymer 147 that may be applied, for example, to flat 143, polymer 147 being, for example, elastically compressible. A guide pin 150 (FIGS. 14A and 14B) may have a flexile feature 152 having, for example, at least one groove 153 along at least a part of guide pin 150 to receive a polymer 157 that may be applied, for example, to groove 153, polymer 157 being, for example, elastically compressible. A guide pin 160 (FIGS. 15A and 15B) may have a flexile feature 162 having, for example, at least one through aperture 163 to receive a polymer 167 that may be applied, for example, to through aperture 163, polymer 167 being, for example, elastically compressible. In other embodiments, a guide pin 170 having at least two (2) blind holes filled with blind hole polymer 177.

Alternatives to achieve mating of ferrules having larger pin-to-bore fits may comprise initiate an offset force in the pin-to-bore fit to force sideways motion and force pins against bore wall. This can be done by adjusting a nominal axis-to-axis distance of the bores from each other, 4.600±0.002 for female specific ferrules and 4.599±0.002 for male specific ferrules. This will "pinch" the pins inward toward each other, effectively eliminating the effects of the so called "sloppy fit." A further alternative may be modifying a pin keeper to cause the pins to "pinch" inward toward each other, either by pulling the first ends together or pushing them apart.

Figure 18A:
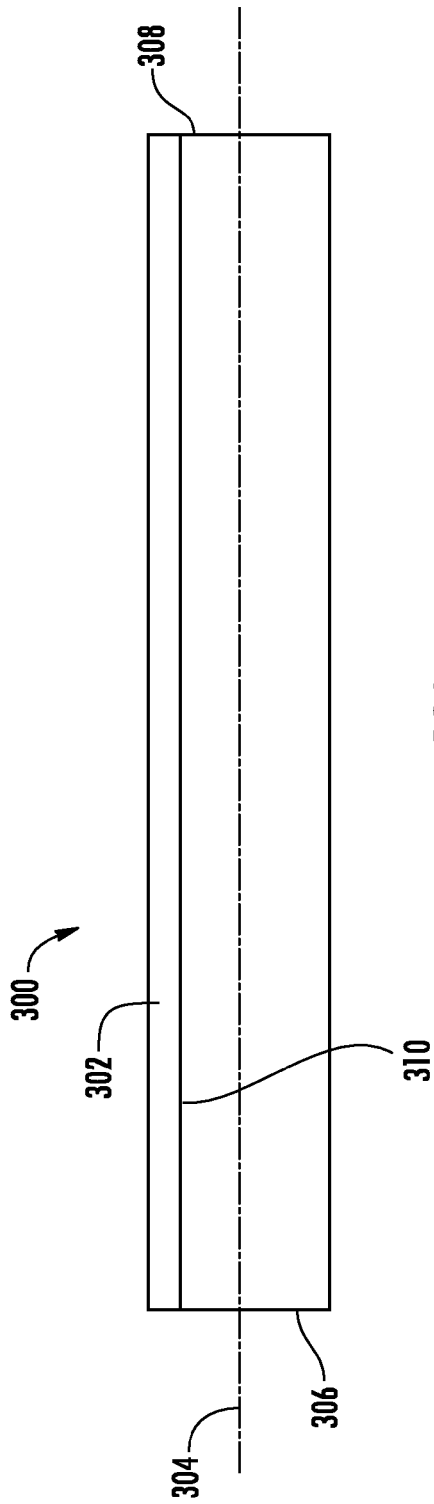
FIGS. 18A and 18B are a side view and an end view of another embodiment of a guide pin having a flexile feature, the flexile feature extending the length of the guide pin.
Figure 18B:
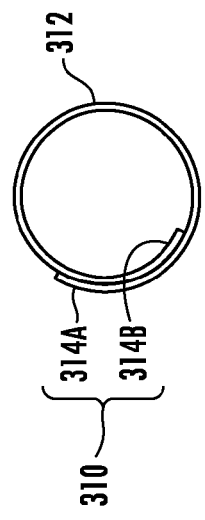

In other exemplary embodiments, a guide pin 200, 300 (FIGS. 17A-B and 18A-B) for mating ferrules may have a discontinuous periphery 212, 312 (FIG. 1B) and include a generally tubular body 202, 302 with an axis 204, 304, for example, a longitudinal axis, generally extending from a first end 206, 306 to a second end 208, 308. First end 206, 306, in exemplary embodiments, may be inserted into a ferrule, for example, an optical ferrule designed to receive guide pins for mating ferrules. Similar to guide pin 10 (see FIG. 1) first end 206, 306 may have a first end width substantially equal to a first engagement width associated with second end 208, 308. The generally tubular body may be made from, for example, a spring steel, and may have at least a "C" shaped profile, though other shapes may be contemplated, for example, an "S" shaped profile. In another embodiment (see FIGS. 18A-B), the profile may be a coil-shaped profile.

Guide pins 200, 300 may have flexile features 210, 310 that may extend from first end 206, 306 to second end 208, 308. Flexile features 210, 310 may include a gap 214 or overlapping portions 314A and 314B that cooperate with discontinuous periphery 212, 312 to enable transverse bending along, for example, the entire length of generally tubular body 202, 302, which may be adapted to compress from the first engagement width to the second engagement width along the entire length of guide pin 200, 300; alternate embodiments may have only a discrete portion of guide pin 200, 300 adapted to compress from the first engagement width to a second engagement width. The second engagement width may, for example, be smaller than the first engagement width. The first engagement width of guide pin 200, 300 may be a nominal width, e.g., diameter, slightly larger than a guide pin bore of an optical ferrule.

At least two thirds (⅔) of the length of guide pin 200, 300, for example, may be inserted into a "male" ferrule, leaving about two (2) mm protruding. The about 2 mm protruding portion may engage a "female" ferrule for ferrule alignment. Once compressed, guide pin 200, 300 may be under a coiled bending stress that provides a constant reactive force to actively center the longitudinal axis 204, 304 of the pins to a longitudinal axis of the guide pin bore, to actively align the respective bores and so align the array of optical waveguides.

A further method of accommodating large pin-to-bore fits involves using eight (8) degree angle face for multimode (MM) ferrules, forcing a controlled transverse offset during mating that forces the mating faces of the ferrules to "lock" together by a spring force supplied by the connector housing. Conventional MM ferrules use a flat, or universal, face for mating opposing ferrules. Large pin-to-bore fits in universal MM ferrules can lead to decreased mating performance due to lateral offset or torsion, causing a misalignment of the optical waveguides therein. By installing an 8 degree angled face, the natural tendency of the ferrule faces to "slide" transversely to a locked position may be predictable and consequently can provide consistent optical mating across an array of optical waveguides.

The foregoing is a description of various embodiments of the disclosure that are given here by way of example only. Although a guide pin having a flexile feature on an end according to the disclosure has been described with reference to preferred embodiments and examples thereof, other embodiments and examples may perform similar functions and/or achieve similar results. All such equivalent embodiments and examples are within the spirit and scope of the present invention and are intended to be covered by the appended claims.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

We claim:

1. A guide pin for mating ferrules, comprising:
an elongated body, the elongated body having a generally roundish cross section and an axis therethrough;
a first end for inserting into a ferrule, at least a portion of the first end having a first end width;
a second end opposite the first end for engaging another ferrule, at least a portion of the second end having a second end width; and
at least one flexile feature, the flexile feature having a first engagement width, which can change to a second engagement width while engaging another ferrule for mating ferrules, the second engagement width being up to 20% smaller than the first engagement width, the at least one flexile feature including at least two cantilevered members.

2. The guide pin of claim 1, the second end width being substantially equal to or greater than the first end width.

3. The guide pin of claim 1, the flexile feature associated with at least the second end.

4. The guide pin of claim 1, the first engagement width being nearer the second end than the first end.

5. The guide pin of claim 1, the flexile feature changing to the second engagement width while engaging another ferrule for mating ferrules nearer the second end than the first end.

6. The guide pin of claim 5, the first engagement width being substantially equal to or greater than the second end width.

7. The guide pin of claim 5, the second engagement width being substantially equal to or smaller than the first end width.

8. The guide pin of claim 1, the flexile feature including a polymer applied to at least a portion of the second end, the applied polymer generally conforming to the generally roundish cross section.

9. The guide pin of claim 8, the polymer including a thermoplastic.

10. The guide pin of claim 8, the polymer including a thermoset.

11. The guide pin of claim 8, the at least one flexile feature including at least one polymer receiving feature nearer the second end than the first end.

12. The guide pin of claim 11, the polymer of the at least one flexile feature being applied to the at least one polymer receiving feature, the at least one polymer receiving feature being selected from the group consisting of a notch, a step, a slot, a channel, a groove, a flat, a blind aperture, a through aperture, and combinations thereof.

13. The guide pin of claim 1, at least a portion of the at least two cantilevered members sharing the generally roundish cross section of the elongated body.

14. The guide pin of claim 1, the elongated body being a generally tubular body.

15. The guide pin of claim 14, the at least one flexile portion extending the entire length of the generally tubular body.

16. The guide pin of claim 14, the generally tubular body having a discontinuous periphery, the discontinuous periphery enabling a distributed bending stress along up to the entire the length of the generally tubular body for changing from the first engagement width to the second engagement along up to the entire length of the generally tubular body.

17. The guide pin of claim 16, the discontinuous periphery having a generally roundish profile with at least one portion of the discontinuous periphery overlapping at least one other portion of the discontinuous periphery defining a coil.

18. The guide pin of claim 16, the discontinuous periphery including a generally roundish profile with a slot running at least partly along the generally tubular body.

19. A fiber optic connector assembly, comprising:
a connector housing;
a multi-fiber ferrule for receiving at least one optical fiber of optical fibers, the ferrule having at least one guide pin bore for receiving a guide pin; and
at least one guide pin inserted in the at least one guide pin bore, the guide pin comprising:
an elongated body, the elongated body having a generally roundish cross section and an axis therethrough;
a first end for inserting into the guide pin bore, at least a portion of the first end having a first end width;
a second end opposite the first end for engaging another guide pin bore while engaging another ferrule having the other guide pin bore, at least a portion of the second end having a second end width; and
at least one flexile feature, the flexile feature associated with at least the second end, the flexile feature having a first engagement width nearer the second end than the first end, which can change to a second engagement width nearer the second end than the first end while engaging another ferrule for mating ferrules, the second engagement width being up to 20% smaller than the first engagement width, the at least one flexile feature including at least two cantilevered members.

* * * * *